United States Patent
Gier et al.

(10) Patent No.: US 10,119,051 B2
(45) Date of Patent: Nov. 6, 2018

(54) BINDER COMPOSITION IN WOODEN COMPOSITE BOARDS

(71) Applicant: SWISS KRONO Tec AG, Lucerne (CH)

(72) Inventors: Andreas Gier, Mandelbachtal (DE); Norbert Kalwa, Horn-Bad Meinberg (DE)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 15/065,054

(22) Filed: Mar. 9, 2016

(65) Prior Publication Data

US 2016/0264830 A1   Sep. 15, 2016

(30) Foreign Application Priority Data

Mar. 9, 2015 (EP) .................................. 15158226

(51) Int. Cl.
| | | |
|---|---|---|
| C08K 5/54 | (2006.01) | |
| C09J 175/04 | (2006.01) | |
| B27N 3/00 | (2006.01) | |
| C08G 18/32 | (2006.01) | |
| C08G 18/76 | (2006.01) | |
| C08K 5/5435 | (2006.01) | |
| C08L 97/02 | (2006.01) | |
| C08G 77/14 | (2006.01) | |

(52) U.S. Cl.
CPC ............ C09J 175/04 (2013.01); B27N 3/002 (2013.01); C08G 18/3206 (2013.01); C08G 18/3287 (2013.01); C08G 18/7664 (2013.01); C08K 5/5435 (2013.01); C08L 97/02 (2013.01); C08G 77/14 (2013.01)

(58) Field of Classification Search
CPC .............................. C08K 5/5419; C08K 5/053
See application file for complete search history.

(56) References Cited

U.S. PATENT DOCUMENTS

| | | | | |
|---|---|---|---|---|
| 4,031,120 A * | 6/1977 | Gervase | ............... | C08G 18/289 106/287.11 |
| 5,973,045 A * | 10/1999 | Dowling | .................. | C08J 5/124 524/270 |
| 6,534,568 B1 * | 3/2003 | Katz | .................... | C08G 18/289 427/387 |
| 2002/0010272 A1 * | 1/2002 | Mahdi | .................... | C08G 18/10 525/100 |
| 2002/0188047 A1 * | 12/2002 | Skinner | ................ | C07F 15/025 524/398 |
| 2003/0096110 A1 * | 5/2003 | Terada | ............... | C08G 18/3206 428/345 |
| 2003/0224179 A1 * | 12/2003 | Skinner | .................. | C08G 18/10 428/425.1 |
| 2006/0051595 A1 * | 3/2006 | Gaudeus | .................... | B32B 7/12 428/423.1 |
| 2006/0293440 A1 * | 12/2006 | Tseitlin | ..................... | C08F 8/42 524/557 |
| 2010/0015450 A1 * | 1/2010 | Burckhardt | ............ | C08G 18/10 428/423.1 |
| 2010/0071849 A1 * | 3/2010 | Knott | .................... | C08G 65/336 156/329 |
| 2010/0317796 A1 * | 12/2010 | Huang | ................... | C08G 18/10 524/588 |
| 2010/0319874 A1 * | 12/2010 | Thiel | ..................... | B22C 1/2273 164/526 |
| 2011/0042004 A1 * | 2/2011 | Schubert | ............ | C08G 18/0866 156/329 |
| 2012/0315491 A1 * | 12/2012 | Paschkowski | ............ | B32B 7/12 428/424.2 |
| 2013/0059075 A1 * | 3/2013 | Appley | .................. | C08G 12/00 427/222 |
| 2013/0131244 A1 * | 5/2013 | Dickens | ................... | C08K 3/26 524/264 |
| 2013/0245164 A1 * | 9/2013 | Limerkens | .............. | C03C 25/32 524/72 |
| 2013/0331484 A1 | 12/2013 | Braum et al. | | |
| 2014/0186621 A1 * | 7/2014 | Popa | ...................... | C08G 18/61 428/339 |
| 2014/0311674 A1 * | 10/2014 | Stanjek | ............. | C08G 18/4825 156/331.4 |
| 2015/0050501 A1 * | 2/2015 | Swiezkowski | ........... | C08K 5/06 428/425.1 |
| 2015/0259461 A1 * | 9/2015 | Laas | .................. | C08G 18/4825 525/102 |
| 2015/0337185 A1 * | 11/2015 | Sherman | ................ | C09J 7/0207 427/208.4 |
| 2016/0096983 A1 * | 4/2016 | Burckhardt | ........ | C08G 18/7671 525/454 |
| 2016/0208146 A1 * | 7/2016 | Arai | ......................... | B32B 27/40 |
| 2016/0244549 A1 * | 8/2016 | Johnston | .............. | C08G 18/718 |
| 2016/0312090 A1 * | 10/2016 | Kulkarni | ................... | C09J 5/00 |
| 2016/0369036 A1 * | 12/2016 | Kramer | ................ | C08G 18/778 |
| 2017/0058076 A1 * | 3/2017 | Araki | ...................... | C08G 18/10 |

FOREIGN PATENT DOCUMENTS

EP   2447332 B1   1/2014

* cited by examiner

*Primary Examiner* — Liam J Heincer
(74) *Attorney, Agent, or Firm* — The Webb Law Firm

(57) ABSTRACT

The present invention relates to a binder composition, in particular for wooden composite boards, obtainable from a binder composition, in particular for wooden composite boards obtainable from
- at least one polymer adhesive,
- at least one polyalcohol compound,
- at least one compound of the general formula (I)

$$R_aSiX_{(4-a)} \qquad (I),$$

or the general formula (II)

$$O_bX_c(OH)_dR_eSiO(4-b-c-d-e)/2 \qquad (II).$$

The present invention relates also to a wooden composite board containing said binder composition.

14 Claims, No Drawings

BINDER COMPOSITION IN WOODEN COMPOSITE BOARDS

CROSS-REFERENCE TO RELATED APPLICATIONS

This application claims priority to European Patent Application No. 15 158 226.9 filed Mar. 9, 2015, the disclosure of which is hereby incorporated in its entirety by reference.

FIELD OF THE INVENTION

The present invention relates to a binder composition, a method for obtaining the same and a wooden composite board.

BACKGROUND

Adhesives or binders are a decisive constituent in the industrial production of a multitude of products, for instance in the production of wooden composite boards. Hereby, wood chipping products are coated with a binder and compressed to molded articles such as boards by applying pressure and temperature. The type and amount of the adhesive used is thereby substantially influenced by the size and quality of the wood fibers and/or wood chips used.

For example, in the production of MDF or HDF boards wood fibers are typically used in combination with formaldehyde resins, as for instance melamine formaldehyde resins or urea formaldehyde resins, whereas wood chips (strands) for producing OSB boards (oriented strand board) are used in combination with polyurethane binders, for instance on PMDI basis.

The strand-shaped waste obtained originally in the veneer and plywood industry were processed at first in small amounts to OSB boards, which were used for different applications. Today, they are mainly used in the wood and pre-fabricated house construction since OSB boards are light-weighted and can still fulfill the static requirements defined for building panels. Thus, OSB boards are used as structural boards and as wall or roof panels or also in the floor field.

The production of OSB boards takes place in a multistage process, wherein at first the chips or strands are cut out of debarked round wood, in particular soft woods, in longitudinal direction by rotating knifes. In the subsequent drying process the natural moisture of the strands is reduced at high temperatures. The moisture content of the strands can vary depending on the adhesive used. Thus, depending on the adhesive, a wetting of more moist strands or of dry strands can be more favorable. Thereby, a variation of the moisture of the strands is only possible to a small degree such that especially the adhesive has to be adapted to the present moisture. Furthermore, as little as possible moisture should be present in the strands during the pressing step in order to reduce the vapor pressure generated during the pressing step as much as possible since this could otherwise promote a bursting of the raw board.

Following the drying of the strands they are fed into an apparatus, in which the glue or adhesive is applied finely dispersed on the chips. Predominantly, PMDI (Polymeric Diphenyl Methane Diisocyanate) or MUPF glues (Melamine-Urea-Phenol-Formaldehyde) are used for gluing. The glues are applied preferably in singular layers. The glues can also be used in the OSB board in a mixed manner. These glues are used since the OSB boards are often used for construction applications as mentioned above. There moisture or wet resistant glues have to be used.

After providing the glue the glued strands are scattered in scattering apparatus alternating lengthwise and crosswise to the production direction such that the strands are arranged crosswise in at least three layers (lower layer-middle layer-upper layer, wherein the scattering direction of lower and upper layer are the same, deviate however from the scattering direction of the middle layer).

Following the scattering of the strands a continuous pressing of the same is carried out at high pressure and high temperature at for instance 200 to 250° C.

As studies have shown a penetration or diffusion of the glue into the wood is to be observed when gluing strands from soft wood (for instance with PMDI). One reason for this is that in particular the hydrophobic PMDI glue is absorbed by the wood surface, which contains depending on the time of the year more or less fatty acids. Therefore, only a part of the glue can be used for gluing the strands on the surface.

In particular, when producing OSB boards additional expenses for glue or adhesive amounts are necessary in order to compensate for the penetration or absorption of the applied glue into the wood chips or strands. This causes significant additional costs.

SUMMARY

An object of the present invention is thus to overcome the described disadvantages when producing OSB boards and to provide a method, which allows a reduction of the used glue or adhesive amounts.

This object is solved according to the invention by a binder composition as described herein and a wooden composite board as described herein.

Accordingly, a binder composition, in particular for wooden composite boards, is provided, which is obtainable from:
at least one polymer adhesive,
at least one polyalcohol compound,
at least one compound of the general formula (I)

$$R_a SiX_{(4-a)} \qquad (I),$$

or the general formula (II)

$$O_b X_c (OH)_d R_e SiO(4-b-c-d-e)/2 \qquad (II),$$

wherein
X is H, OH or a hydrolysable moiety selected from the group comprising halogen, alkoxy, carboxyl, amino, monoalkylamino or dialkylamino, aryloxy, acyloxy, alkylcarbonyl,
R is a non-hydrolysable organic moiety R selected from the group comprising substituted and unsubstituted akyl, substituted and unsubstituted aryl, substituted and unsubstituted alkenyl, substituted and unsubstituted alkinyl, substituted and unsubstituted cycloalkyl, which may be interrupted by —O— or —NH—, and
wherein R has at least one functional group Q selected from a group comprising an epoxide, hydroxyl, ether, amino, monoalkylamino, dialkylamino, substituted and unsubstituted aniline, amide, carboxyl, alkinyl, acryl, acryloxy, methacryl, methacryloxy, mercapto, cyano, alkoxy, isocyanate, aldehyde, alkylcarbonyl, acid anhydride and/or phosphoric acid group, and
R and X can be in each case the same or different from each other, and a=0, 1, 2, 3, in particular 0 or 1, b, c, d=0 or 1, and e=1, 2, 3.

Within the meaning of the present application it is apparent for a skilled person that the silane containing compounds with the general formula (II) are derived directly as hydrolysis and/or condensation products from the silane compounds of the general formula (I). The hydrolysis and/or condensation of the compounds of the general formula (I) is caused and influenced by the reaction conditions, in particular by acidic reaction conditions, during the production of the adhesive.

Due to the combination of silane compound and polyalcohol according to the invention at first a compound or reaction mixture is obtained, which is strongly hydrophilic due to the variety of OH groups in the polyalcohol on one molecule side. On the other hand, the molecule obtained from silane and polyalcohol contains reactive groups due to this specifically modified silane, which can react with the polymer adhesive, as for instance PMDI glue, or also with the OH groups of the wood. These new compounds and the macromolecules created by condensation with the glue are not any longer capable of passing the hydrophobic fatty acid layer of the strands due to the hydrophilic residues. Therefore, the present binder composition remains on the surface of the strands or fiber and does not diffuse into the wood matrix. One can also say that the polymer adhesive is now provided with a hydrophilic anchor.

In an embodiment the at least one polyalcohol compound is selected from a group containing tetravalent, pentavalent, hexavalent alcohols (also known as reduced sugar or alditols), n-polyglycols and n-polyvinyl alcohols. Thereby, threit, erythrit, pentaerythrit can be used as tetravalent alcohols, arabit, adonit, xylit as pentavalent alcohols and sorbit, mannit, dulcit, dipentaerythrit as hexavalent alcohols. Also, higher valent alcohols with more than six hydroxyl groups, as for instance seven or eight hydroxyl groups, can be used. Suitable polyglycols are for instance polyethylene or polypropylene glycol. The use of sorbit has been shown to be of particular advantage.

The amount of polyalcohol compounds in the binder composition is between 5 to 50 wt %, preferably 10 to 30 wt %, and in particular preferably 5 to 10 wt % in respect to the total amount of the binder composition.

The moiety X is advantageously selected from a group including fluorine, chlorine, bromine, iodine, $C_{1-6}$ alkoxy, in particular methoxy, ethoxy, n-propoxy and butoxy, $C_{6-10}$ aryloxy, in particular phenoxy, $C_{2-7}$ acyloxy, in particular acetoxy or propinoxy, $C_{2-7}$ alkylcarbonyl, in particular acetyl, monoalkylamino or dialkylamino with $C_1$ to $C_{12}$, in particular $C_1$ to $C_6$. Particularly preferred hydrolysable groups include $C_{1-4}$ alkoxy groups, in particular methoxy and ethoxy.

The non-hydrolysable R is preferably selected from a group comprising substituted and unsubstituted $C_1$-$C_{30}$ alkyl, in particular $C_5$-$C_{25}$ alkyl, substituted and unsubstituted $C_2$-$C_6$ alkenyl, substituted and unsubstituted $C_2$-$C_6$ alkinyl and substituted and unsubstituted $C_6$-$C_{10}$ aryl.

In one embodiment, the non-hydrolysable moiety R is selected from a group including methyl, ethyl, n-propyl, isopropyl, n-butyl, s-butyl, t-butyl, pentyl, hexyl, cyclohexyl, vinyl, 1-propinyl, 2-propinyl, butenyl, acetylenyl, propagyl, phenyl and naphtyl.

In accordance with the present application the term "non-hydrolysable organic moiety" is to be understood as an organic moiety which in the presence of water does not lead to the formation of an OH group or $NH_2$ group linked with the Si atom.

In a variant, the at least one functional group Q is selected from a group including epoxide, hydroxy, ether, acryl, acryloxy, methacryl, methacryloxy, amino, alkoxy, cyano and/or isocyano groups. The at least one functional group Q, which is included in the organic non-hydrolysable moiety R, comprises in a further variant preferably an epoxide, in particular a glycidyl or glycidyloxy group, an alkoxy, an amino or an isocyano group.

The functional groups which allow a linking of the polymer adhesive and the wood surface, comprise in particular polymerisable and/or polycondensible groups, whereby polyaddition reactions are also to be understood as polymerization reactions. The functional groups are preferably selected such that the possibly catalyzed polymerization and/or condensation reactions provide an organic linking between the polymer adhesive and the wood surface and also possibly between different adhesive systems.

In a particular preferred embodiment tetraethoxysilane, methyltriethoxysilane, gamma-isocyanatopropyltriethoxysilane or a glycidyloxypropyltriethoxysilane are used.

As described, the non-hydrolysable moiety R necessarily has at least one functional group Q. In addition, the moiety R also can be present in substituted form with further moieties.

The term "substituted", in use with "alkyl", "alkenyl", "aryl", etc. designates the substitution of one or more atoms, in general H atoms, by one or more of the following substituents, preferably by one or two of the following substituents: halogen, hydroxy, protected hydroxy, oxo, protected oxo, $C_3$-$C_7$ cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1$-$C_{12}$ alkoxy, $C_1$-$C_{12}$ acyl, $C_1$-$C_{12}$ acyloxy, acryloyloxy, nitro, carboxy, protected carboxy, carbamoyl, cyano, methylsulfonylamino, thiol, $C_1$-$C_{10}$ alkylthio and $C_1$-$C_{10}$ alkylsulfonyl. The substituted alkyl groups, aryl groups, alkenyl groups can be substituted once or several times, and preferably 1 or 2 times, with the same or different substituents.

The term "alkinyl", as used here, designates a moiety of the formula R—C≡C—, in particular a "$C_2$-$C_6$ alkinyl". Examples for $C_2$-$C_6$ alkinyls include: ethinyl, propinyl, 2-butinyl, 2-pentinyl, 3-pentinyl, 2-hexinyl, 3-hexinyl, 4-hexinyl, vinyl as well as di- and triines of straight and branched alkyl chains.

The term "aryl", as used herein, designates aromatic hydrocarbons, for example phenyl, benzyl, naphthyl or anthryl. Substituted aryl groups are aryl groups which, as defined above, are substituted with one or more substituents, as defined above.

The term "cycloalkyl" comprises the group cyclopropyl, cyclobutyl, cyclopentyl, cyclohexyl and cycloheptyl.

In a preferred embodiment, the present binder composition comprises at least two compounds of the general formula (I) and/or (II).

Thus, a binder composition can be used, in which a first compound corresponds to the formula $SiX_4$ with X being OH or alkoxy, in particular methoxy, ethoxy, n-propoxyy or i-propoxy and a second compound corresponds to the formula $R_aSiX_{(4-a)}$ with a=1 or 2, wherein X being OH or alkoxy, in particular methoxy, ethoxy, n-propoxy or i-propoxy, R is methyl, ethyl, n-propyl or n-butyl and Q is a glycidyl or glycidyloxy group, an alkoxy, an amino or an isocyano group. The molar ratio of the first and the second compound can thereby be 0.1 to 1 mol, preferably 0.1 to 0.5 mol, in particular preferably 0.1 to 0.4 mol.

In a preferred embodiment of the present binder composition a polymer adhesive is preferably used which is selected from the group containing formaldehyde adhesives, polyurethane adhesives, epoxide resin adhesives, polyester adhesives. In particular, a phenol-formaldehyde-resin adhesive (PF), a cresol/resorcin-formaldehyde resin adhesive, urea-formaldehyde resin adhesive (UF) and/or melamine-formaldehyde-resin adhesive (MF) can be used as formaldehyde condensation adhesive.

At present the use of a polyurethane adhesive is preferred, wherein the polyurethane adhesive is present on the basis of aromatic polyisocyanates, in particular polydiphenylmethanediisocyanate (PMDI), toluylendiisocyanat (TDI) and/or diphenylmethanediisocyanate (MDI), wherein PMDI is in particular preferred.

In a further embodiment of the present method it is also possible to use more than one polymer adhesive. Thus, as a first polymer adhesive at least one polycondensation adhesive such as a polyamide, a polyester, a silicon and/or a formaldehyde condensation adhesive, in particular a phenol-formaldehyde resin adhesive (PF), a cresol/resorcin-formaldehyde resin adhesive, urea-formaldehyde resin adhesive (UF) and/or melamine-formaldehyde resin adhesive (MF) can be used, and as a second polymer adhesive at least one polyaddition adhesive such as an epoxy resin, polycyanurate and/or a polyurethane adhesive, in particular a polyurethane adhesive on the basis of polydiphenylmethanediisocyanate (PMDI) can be used. Such hybrid adhesive systems are known from EP 2 447 332 B1.

In a further embodiment, the amount of polymer adhesive in the presently used binder composition is at least 95 wt %, preferably at least 80 wt %, in particular preferably at least 70 wt %.

Thereby, the amount of the reaction mixture of at least one silane compound of the formula (I) and/or (II) and the at least one polyalcohol compound can be 1 to 20 wt %, preferably 2 to 15 wt %, in particular preferably 3 to 10 wt % in respect to the amount of polymer adhesive.

The solvent content that is essentially caused by the use of the silanes is also between 1 to 15 wt %, preferably 2 to 13 wt %, in particular preferably between 4 to 10 wt %. The solvent content of the used polymer adhesive is, however, not yet taken into account in this specification.

A specifically preferred variant of the present binder composition comprises tetraethylorthosilicate, glycidyloxypropyltrimethoxysilane, sorbitol and PMDI glue as polymer adhesive.

In a further embodiment of the present binder composition it is possible to add nanoparticles to the composition. The preferably used particles have a size between 2 and 400 nm, preferably between 2 and 100 nm, particularly preferably between 2 and 50 nm. The particles can be in particular of an oxidic, hydroxidic or oxihydroxidic nature, which can be produced by different methods such as for example ion exchange process, plasma process, sol gel process, grinding or also flame deposition. In a preferred embodiment particles on the basis of $SiO_2$, $Al_2O_3$, $ZrO_2$, $TiO_2$, SnO are used, wherein in particular preferably nanoscalic $SiO_2$ particles in form of an aqueous suspension (i.e. acid suspension of $SiO_2$ stabilzed with $Al^{3+}$ or $Na^+$ cations) can be used.

As already mentioned above, the present binder composition can be used in the production of wood particle boards or wood fiber boards, in particular OSB, HDF or MDF boards as well as plywood and glued laminated timber.

The presently used binder composition can be produced by a method comprising the following steps:
 providing at least one, preferably at least two different compounds of the general formula (I) and/or (II);
 addition of at least one polyalcohol compound;
 addition of at least one catalyst, in particular an acid, to the mixture of at least one compound of formula (I) and/or (II) and the at least one polyalcohol compound;
 precipitation and separation of the reaction mixture of at least one compound of formula (I) and/or (II) and the at least one polyalcohol compound, and
 addition of the at least (first) polymer adhesive to the separated reaction mixture of at least one compound of formula (I) and/or (II) and the at least one polyalcohol compound.

In a further step it is also possible to add a further second polymer adhesive to the binder composition. The second polymer adhesive preferably differs from the first polymer adhesive. It is for instance conceivable to use as a first polymer adhesive a polyurethane adhesive as for instance PMDI and as a second polymer adhesive a formaldehyde adhesive such as melamine-formaldehyde adhesive.

Inorganic and/or organic acids suitable as catalysts are selected from a group including phosphoric acid, acidic acid, para-toluene sulfonic acid, hydrochloric acid, formic acid or sulphoric acid. Ammonium salts such as ammonium sulfate, which react as week acids, are also suitable. para-Toluene sulfonic acid is in particular preferred.

The use of sodium glycerol phosphate has been shown in particular suitable for precipitating the reaction mixture of at least one compound of formula (I) and/or (II) and the at least one polyalcohol compound. Further precipitating means can also be alkaline solutions such as NaOH, KOH or ammonium hydroxide solutions.

The precipitating means is preferably added together with water to the reaction mixture of at least one compound of formula (I) and/or (II) and the at least one polyalcohol compound. In this manner, the reaction product of at least one compound of formula (I) and/or (II) and at least one polyalcohol compound is concentrated in the aqueous phase and separated from the hydrolysis product such as ethanol.

In case that nanoparticles are admixed to the binder composition the particles are preferably used in an amount between 0.1 to 15 wt %, preferably 0.5 to 10 wt %, in particular preferably between 1 to 5 wt %.

The temperatures during the entire production process of the adhesive system are usually in the range between 20 and 80° C., preferably between 30 and 60° C.

The object of the present invention is also solved by a wooden composite board with the present binder composition.

Accordingly, at least one binder composition according to the invention is contained in at least one wooden composite board, in particular a wood particle board and/or a wood fiber board, such as an OSB, HDF or MDF board. It should be noted that in particular the use of the adhesives PMDI and MUPF in the top layer of OSB boards improves the technological values of the board such as transverse pull and bending strength and at the same time reduces swelling.

The amount of binder composition in the wooden composite board, in particular in an OSB wooden board, is between 1.0 and 2.5 wt %, preferably 1.5 and 2.5 wt %, in particular preferably 1.7 and 2.2 wt % in respect to the total amount of wood fibers or wood strands. In a variant, the OSB wooden board contains a polyurethane adhesive or a formaldehyde adhesive as polymer adhesive.

The present wooden composite board is produced in a method comprising the following steps:
a) producing wood chips or wood strands (OSB strands) from suitable timber,
b) chipping the wood chips to wood fibers,
c) possibly temporary storage of the wood particles or wood fibers, in particular in silos or bunkers,
d) drying the wood particles or wood fibers,
e) sorting or classifying the wood particles or wood fibers corresponding to the size of the wood particles or wood fibers,
f) possibly further comminution of the wood particles or wood fibers and temporary storage,
g) applying the wood particles or would fibers onto a transport belt by means of pneumatic and/or spreader classification, and
h) compressing the wood particles or wood fibers arranged on the transport belt, wherein the binder composition according to the invention can be added before, during and/or after one of the steps b) to h). The binder composition thus can be mixed with the wood particles or wood fibers at any time of the production process. It is, however also conceivable that the adhesive is applied onto the wood particles or wood fibers at several points.

In addition to the method steps listed above the wood chips are cleaned of foreign substances before their comminution, e.g. in connection with a dry cleaning or wet cleaning.

In a preferred embodiment the binder composition is sprayed onto the wood particles or wood fibers. The amount of the applied binder composition is between 1 to 2.5 wt % in respect to the used amount of particles or fibers.

In case of the production of OSB boards the used wood strands can have a length between 50 to 200 mm, preferably 70 to 180 mm, in particular preferably 90 to 150 mm; a width between 5 to 50 mm, preferably 10 to 30 mm, in particular preferably 15 to 20 mm; and a thickness between 0.1 and 2 mm, preferably between 0.3 and 1.5 mm, in particular preferably between 0.4 and 1 mm.

By means of the method as described herein it is now possible to provide plywood or fiber boards, such as OSB, MDF or HDF boards with the binder composition according to the invention.

DETAILED DESCRIPTION

The invention will be explained in detail below by means of an example.

EXAMPLE

A mixture of 34.2 g sorbitol (50 w/% in demineralized water) in 4 g para-toluol sulfonic acid is added to a mixture consisting of 20.33 g tetraethylorthosilicate (0.1 mol) and 139.2 glycidyl oxypropyltriethoxysilane (0.5 mol). Hereby, a hydrolysis of the silane mixture and a reaction with the sorbitol takes place, wherein the condensation degree is kept low on purpose. The reaction process and the condensation degree are followed up by Si—NMR measurements.

After a stirring time of 4 hours, a mixture of 136.8 g demineralized water and 34 g sodium glycerol phosphate is added to the above reaction mixture. Said mixture is stirred for further 60 minutes.

After a resting time of about 1 hour a two-phase mixture is formed. The lower aqueous phase containing the reaction product of silane and sorbitol is separated from the upper alcoholic phase.

The aqueous binder phase containing the reaction product of silanes and sorbitol is added to 428 g PMDI glue. This mixture has to be homogeneous. The aqueous binder phase is added to PMDI as binder in concentrations of 5 wt % and 20 wt %.

Subsequently, the binder composition is applied onto a plywood pattern or a plywood sample. 1 ml of the solution was applied in each case onto a cut surface of the wood sample and dried in a drying oven at 100° C. for 15 minutes. Subsequently, the penetration depth of the solution was determined visually. Five wood examples were tested per experiment.

RESULTS

Pure PMDI glue penetrates far into the plywood sample when using this method (curing at 100° C. for 15 minutes) and thus disappears at the adhesive surface. The PMDI glue sinks thereby very far into the plywood sample, what is detectible on the front side as well as on the back side of the plywood sample.

In contrast, when adding 5 wt % of the reaction product of silane and sorbitol to the PMDI glue a different result is obtained after curing at 100° C. for 15 minutes. On the front side as well as on the back side there are no penetration tracks of the modified glue to be detectable when increasing the amount of reaction product of silane and sorbitol to 20 wt % and curing at 100° C. for 15 minutes the glue even remains completely on the surface and appears to foam slightly.

The results show clearly that by adding a reaction mixture of modified silanes with a polyalcohol such as sorbitol to a PMDI glue an absorption or diffusion of the PMDI glue into the wood fibers can be prevented whereby a reduction of the required binder amount in the production process of wooden composite boards is possible.

The invention claimed is:

1. A binder composition, in particular for wooden composite boards obtainable from
at least one polymer adhesive selected from a formaldehyde adhesive, polyurethane adhesive, epoxide resin adhesive, or polyester adhesive,
at least one polyalcohol compound selected from an alditol,
one compound of the general formula (I)

$$R_a SiX_{(4-a)} \quad (I),$$

or the general formula (II)

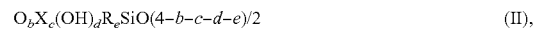

$$O_b X_c (OH)_d R_e SiO(4-b-c-d-e)/2 \quad (II),$$

wherein
X is H, OH or a hydrolysable moiety selected from the group comprising halogen, alkoxy, carboxyl, amino, monoalkylamino or dialkylamino, aryloxy, acyloxy, alkylcarbonyl,
R is a non-hydrolysable organic moiety R selected from the group comprising substituted and unsubstituted akyl, substituted and unsubstituted aryl, substituted and unsubstituted alkenyl, substituted and unsubstituted alkinyl, substituted and unsubstituted cycloalkyl, which may be interrupted by —O— or —NH—, and
wherein R has at least one functional group Q selected from a group comprising an epoxide, hydroxyl, ether, amino, monoalkylamino, dialkylamino, substituted and unsubstituted aniline, amide, carboxyl, alkinyl, acryl, acryloxy, methacryl, methacryloxy, mercapto, cyano, alkoxy, isocyanate, aldehyde, alkylcarbonyl, acid anhydride and/or phosphoric acid group, and R and X can be in each case the same or different from each other, and a=0, 1, 2, 3, in particular 0 or 1, b, c, d=0 or 1, and e=1, 2, 3, wherein at least two different compounds of the general formula (I) and/or (II) are used, and wherein a first compound corresponds to the formula $SiX_4$ with X being OH or alkoxy and a second compound corresponds to the formula $R_aSiX_{(4-a)}$ with a=1 or 2, wherein X being OH or alkoxy, R is methyl, ethyl, n-propyl or n-butyl and Q is a glycidyl or glycidyloxy group, an alkoxy, an amino or an isocyano group.

2. The binder composition according to claim 1, wherein the at least one alditol is selected from the group containing tetravalent, pentavalent, and hexavalent alditols.

3. The binder composition according to claim 1, wherein the at least one alditol comprises a tetravalent alditol.

4. The binder composition according to claim 1, wherein X is selected from a group comprising fluorine, chlorine, bromine, iodine, $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, $C_{2-7}$-alkylcarbonyl, in particular acetyl, monoalkylamino or dialkylamino with $C_1$ to $C_{12}$, in particular $C_1$ to $C_6$.

5. The binder composition according to claim 1, wherein R is selected from a group comprising substituted and unsubstituted $C_1$-$C_{30}$-alkyl, in particular $C_5$-$C_{25}$-alkyl, substituted and unsubstituted $C_2$-$C_6$-alkenyl, substituted and unsubstituted $C_2$-$C_6$-alkinyl and substituted and unsubstituted $C_6$-$C_{10}$-aryl.

6. The binder composition according to claim 1, wherein R is selected from a group comprising methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, phenyl and naphthyl.

7. The binder composition according to claim 1, wherein the at least one functional group Q selected from a group comprising an epoxide, hydroxyl, ether, acryl, acryloxy, methacryl, methacryloxy, amino, alkoxy, cyano and/or isocyano group.

8. The binder composition according to claim 1, wherein the at least one functional group Q is an epoxide, in particular a glycidyl or glycidyloxy group, an alkoxy, an amino or an isocyano group.

9. The binder composition according to claim 1, wherein the polymer adhesive is a polyurethane adhesive on the basis of polydiphenyl methane diisocyanate (PMDI).

10. The binder composition according to claim 1, wherein the at least one alditol comprises a pentavalent alditol selected from the group consisting of arabitol, adonitol, and xylitol.

11. The binder composition according to claim 1, wherein the at least alditol compound comprises a hexavalent alditol.

12. The binder composition according to claim 1, wherein the molar ratio of the first and the second compound is selected within a range of from 0.1:1 to 1:1 mol.

13. A method for obtaining a binder composition according to claim 1 comprising the steps:

providing at least two different compounds of the general formula (I) and/or (II);

addition of at least one polyalcohol compound selected from an alditol;

addition of at least one catalyst, in particular an acid, to the mixture of at least two different compounds of formula (I) and/or (II) and at least one polyalcohol compound;

precipitation and separation of the reaction mixture of at least two different compounds of the formula (I) and/or (II) and at least one polyalcohol compound, and addition of at least one polymer adhesive system selected from a formaldehyde adhesive, polyurethane adhesive, epoxide resin adhesive, or polyester adhesive to the separated reaction mixture of at least two different compounds of formula (I) and/or (II) and at least one polyalcohol compound, and wherein a first compound corresponds to the formula $SiX_4$ with X being OH or alkoxy and a second compound corresponds to the formula $R_aSiX_{(4-a)}$ with a =1 or 2, wherein X being OH or alkoxy, R is methyl, ethyl, n-propyl or n-butyl and Q is a glycidyl or glycidyloxy group, an alkoxy, an amino or an isocyano group.

14. A wooden composite board, in particular a wood chip board and/or wood fiber board, comprising at least one binder composition according to claim 1.

* * * * *